Jan. 12, 1926. 1,569,705
O. BUESCHER ET AL
PLOWING ATTACHMENT FOR TRACTORS
Filed August 29, 1923 2 Sheets-Sheet 1
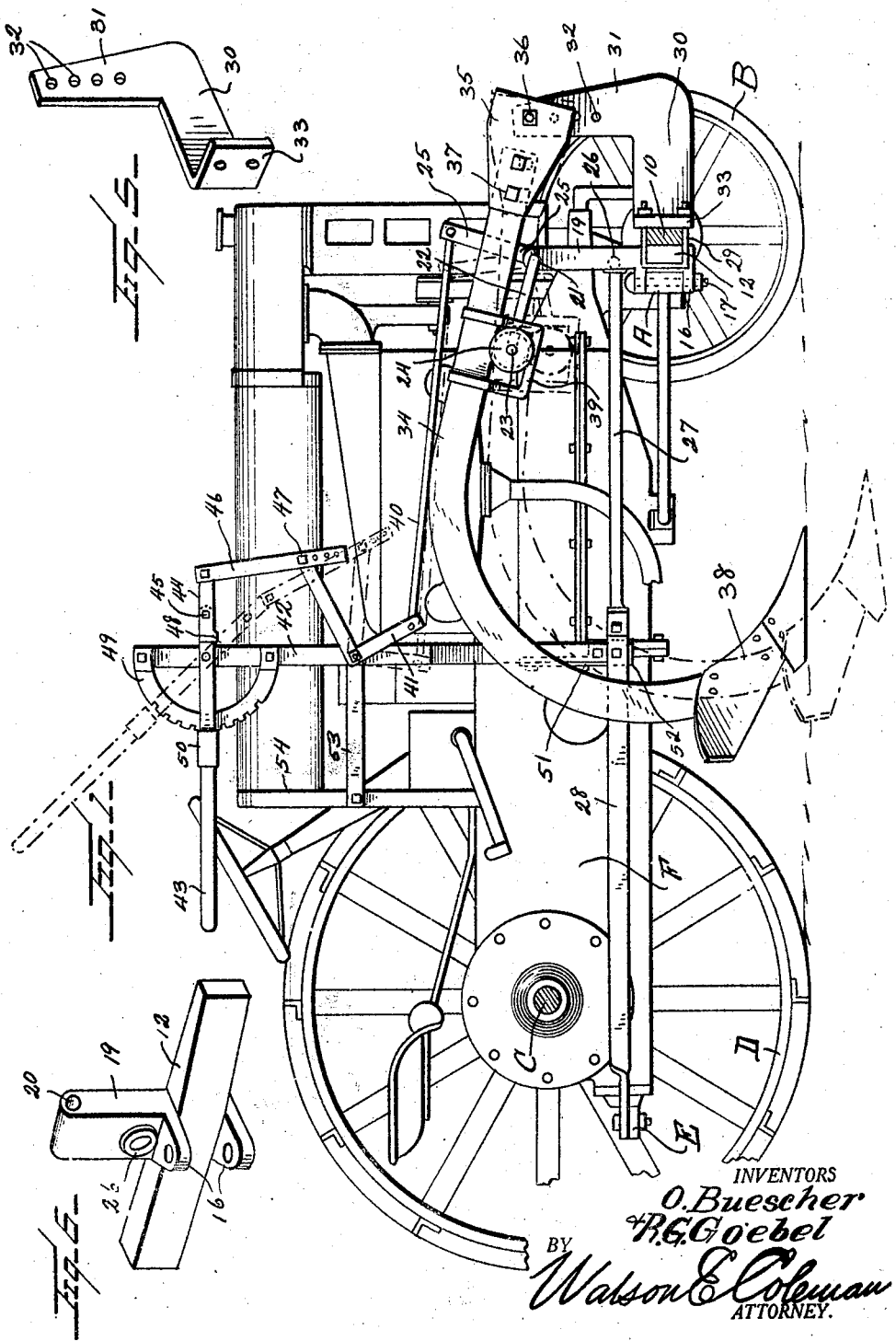
INVENTORS
O. Buescher
P. G. Goebel
BY
Watson E. Coleman
ATTORNEY.

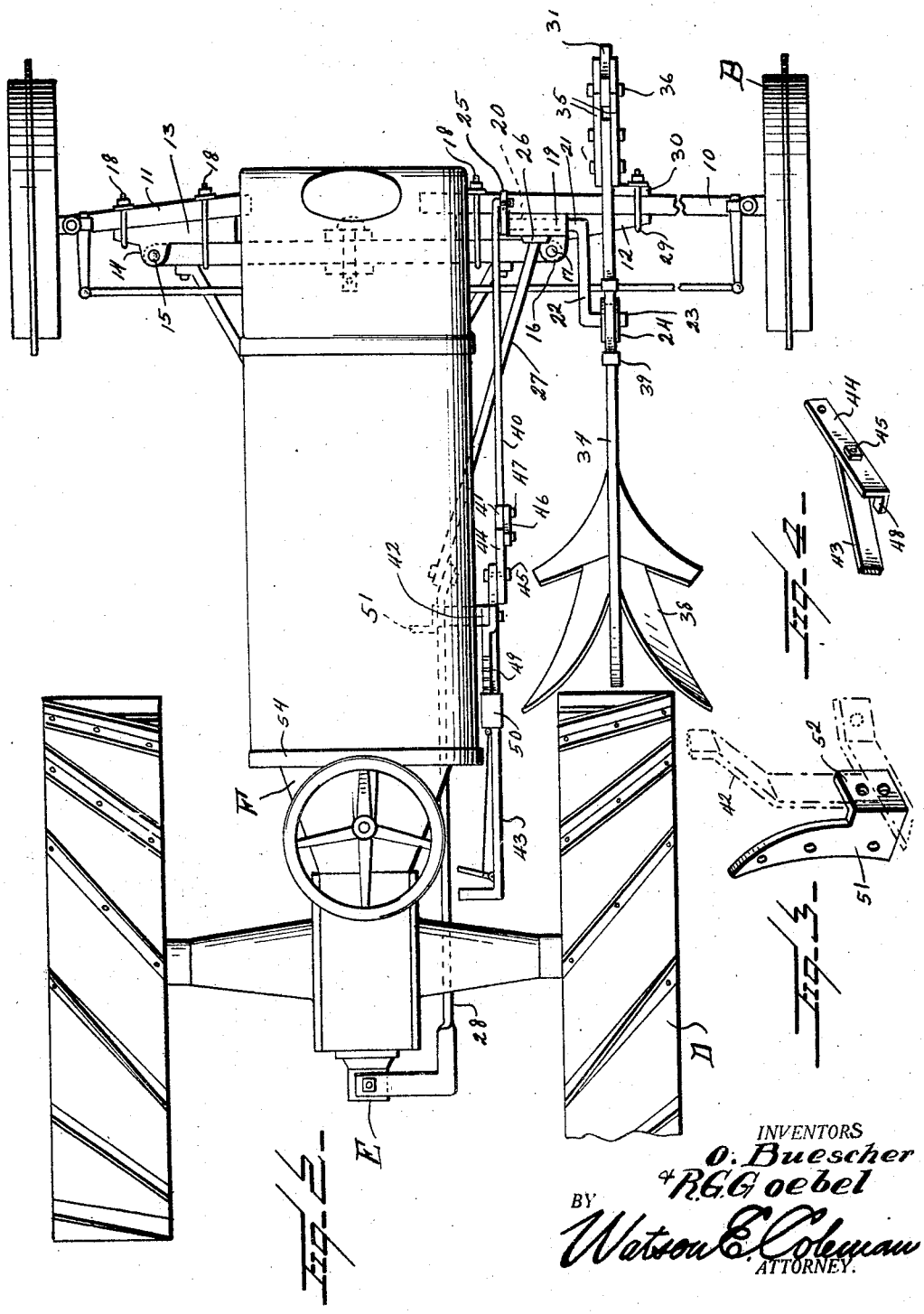

Patented Jan. 12, 1926.

1,569,705

UNITED STATES PATENT OFFICE.

OSWALD BUESCHER AND RHYNE G. GOEBEL, OF SMITHVILLE, TEXAS.

PLOWING ATTACHMENT FOR TRACTORS.

Application filed August 29, 1923. Serial No. 660,018.

*To all whom it may concern:*

Be it known that we, OSWALD BUESCHER and RHYNE G. GOEBEL, citizens of the United States, residing at Smithville, in the county of Bastrop and State of Texas, have invented certain new and useful Improvements in Plowing Attachments for Tractors, of which the following is a specification, reference being had to the accompanying drawings.

This invention relates to plows, and particularly to means for attaching a plow to a standard form of tractor.

One of the objects of the invention is to provide means whereby a plow with its accompanying beam and other allied parts may be readily attached to or detached from a tractor.

A further object is to provide very simple means forming part of the attachment whereby the plow may be raised or lowered.

A still further object is to provide means whereby the plow beam may be operatively supported upon the front axle of the tractor, and provide means whereby the strain exerted by the plow may be distributed and transmitted to the draw bar of the tractor so that all of the strain will not come upon the front axle.

Another object is to provide means whereby substitute axles may be mounted upon the regular axle so as to extend laterally beyond the ordinary axle and carrying forward wheels at points laterally spaced from the normal position of the forward wheels.

Still another object is to provide means whereby the plow beam may be raised or lowered to any desired point so that it may be adjusted to suit any circumstances of operation.

Other objects will appear in the course of the following description.

Our invention is illustrated in the accompanying drawings, wherein:—

Figure 1 is a side elevation of a tractor with our attachment applied thereto, the rear and front axle of the tractor being in section;

Figure 2 is a top plan view of a tractor having our plowing attachment applied thereto;

Figure 3 is a perspective view of the brace or bracket 51;

Figure 4 is a fragmentary perspective view showing the manner in which the lever section 44 is connected to the lever section 43, the lever section 43 being shown as raised relative to the section 44;

Figure 5 is a perspective view of the bracket 30;

Figure 6 is a perspective view of the spacing member 12 and the bearing bracket 19.

Referring to the drawings, it will be seen that in Figure 1 we have illustrated a tractor of common form and having the usual front axle A, the front wheels B, the rear axle C, the rear wheels D, and the draw bar E. Our attachment comprises means whereby the wheels B may be supported upon the front axle A but laterally disposed with relation to the ends of the front axle. To this end we provide the extension axles 10 and 11, the extension axle 10 being on the right hand side of the machine and this extension axle 10 is disposed at a slight angle with the front axle A and is spaced from the front axle and held in proper angular relation by a spacing member 12. The extension axle 11 is also held in spaced relation to the front axle by a spacing member 13. This spacing member 13 is provided with ears 14 into which the extremity of the front axle A projects, these ears being perforated for the passage of a bolt 15 downward through the ears and through the spindle opening in the end of the axle A. The spacing member 12 is also provided with ears 16 having an opening for the passage of a pin 17 or bolt which extends down through the corresponding spindle opening of the front axle. The extension axles, the spacing members, and the regular axle are engaged with each other by means of the U-bolts 18. It will be seen that the spacing member 12 for that portion of its length which is engaged by the regular axle A is slightly wedge-shaped, while the spacing member 13 is also wedge-shaped but to a greater degree.

Mounted upon or forming part of the spacing member 12 is an upwardly extending bracket 19 having a bearing 20 in its upper end (see Figure 6), through which passes a crank shaft 21, this crank shaft having a rearwardly directed arm 22 angularly bent at its end, as at 23, and carrying grooved rollers 24. The opposite end of the crank shaft 21 has an upwardly extending arm 25. The member 19 is formed with a socket 26, and having one end disposed within this socket is a brace rod or thrust rod section 27 which at its forward end may be formed with a ball to fit in said socket, the metal of the member 19 being overturned. The rear end of this rod section 27 is connected to a second rod section 28 which is angularly bent at its forward end and bolted to the first named rod section, and rearward of this angularly bent end the rod section 28 extends straight rearward to a position over the draw bar E and is angularly bent and bolted to this draw bar. Thus any strain which may come upon the member 19 will thus be transmitted to the draw bar E.

Clasping the axle section 10 and the spacing member 12 is a U-shaped clamping bolt 29, shown most clearly in Figure 1, and supported by means of this bolt is a supporting bracket 30. This bracket is angular so as to provide an upwardly extending arm 31 having a series of openings 32 and at its rear end the bracket is angularly bent, as at 33, so as to lie against the face of the extension axle 10, the angular portion 33 being perforated for the passage of the arms of the U-bolt 29, as shown in Figure 1. Thus the bracket is supported upon the extension axle.

A plow beam 34 of ordinary form is embraced at its end by an iron 35 which is H-shaped in top plan view, this iron being pivoted to the upwardly extending arm 31 by means of a bolt 36 and the plow beam 34 being inserted within the rear portion of the iron and bolted thereto by the bolts 37. Thus it will be seen that the plow beam 34 is pivoted for movement in a vertical plane. The plow beam carries a plow 38 of any suitable character but shown as a double mold board plow.

Mounted upon the plow beam 34 is a U-shaped yoke 39 which extends below the plow beam and the grooved wheel 24 operates within this yoke or between the horizontal bar of the yoke and the lower edge of the plow beam. Thus it will be seen that as the crank arm 22 is moved downward, the plow beam will be lowered, and as the crank arm 22 is moved upward the plow beam will be raised.

For the purpose of raising or lowering the crank arm 22, we connect to the arm 25 a rod 40 which extends rearward and is connected to a bell crank lever 41 which is pivotally mounted upon an upright support 42 mounted upon the frame of the tractor, as will be later described. Also mounted upon the upper end of this support 42 is a lever 43, the forward end of this lever being pivoted to an iron 44 at 45 which forms a sectional part of the lever, and a link 46 is pivoted to the extremity of this iron 44 and to the extremity of one arm of the bell crank lever 41, this link 46 being provided with a plurality of openings for the bolt 47 connecting the link 46 to the bell crank lever 41. The iron or section 44 is provided with a lip 48 which engages under the extremity of the lever section 43. Thus it will be obvious that when the section 43 is lowered or raised, the section 44 will be lowered or raised, or rather that when the lever 43 is raised the weight of the plow beam 34 of the plow acting through the link connection will cause the depression of the section 44 also. Thus the plow may be raised or lowered. If, however, the plow should strike a stone or other obstruction which would tend to raise the plow, the plow will lift, which will cause an elevation of the link 46 and the section 44 will rock without affecting the lever 43, which lever is intended to be locked in its adjusted position upon a toothed rack 49, the lever 43 being provided with any usual or ordinary locking means 50 engageable with the teeth of this rack to hold the lever in adjusted position.

The rear section 28 of the brace or thrust rod is bolted to a bracket 51, this bracket being cut out to fit around the transmission housing F of the tractor and being bolted to the flange at the end of this transmission housing by the usual bolts which hold the crank case to the transmission housing, this bracket having a flanged base portion 52 to which the section 28 is bolted, as before stated. The lower end of the standard 42 is also bolted to this bracket and is furthermore supported by a brace 53 which is bolted to the standard by the same bolt which bolts the bell crank lever 41, this brace extending rearward and being bolted to the frame 54 which forms part of the tractor.

It will be seen that with this construction it is an easy matter to attach the plow beam to or detach it from a tractor and to raise or lower the plow beam to any desired extent. Obviously any desired form of plows or other cultivating implements may be applied to the beam and we do not wish to be limited to the beam 34 merely as a support for a plow. By bracing the steering wheels relatively far apart, more leverage is secured in turning for guiding the machine against the action of the plow and more resistance will be had to any side draft. Of course, a connecting rod is used between the knuckles of the wheels in the usual manner, which connecting rod is engaged with the usual steering mechanism forming no part of our invention. By pivotally supporting the forward end of the plow beam 34 in advance of the axle, we secure a quick response to any lateral movement given to the tractor by means of the steering mechanism.

The invention is simple, can be readily applied, readily removed, and is sufficiently solid in construction so that the device may be used in hard ground or where plowing is difficult.

This attachment is designed, as before stated, for a tractor now greatly used and is used on row work or may be used for broadcasting by detaching the mold board and attaching a broadcasting mold board. The axle extensions 10 and 11 are supported at an angle so as to miss the bolt in the center of the engine, and furthermore to balance the axle and miss the other axle ends. The extensions are on both sides for the reason that the left wheel would otherwise run on top of the row and constantly slip off unless the axle is extended to let the wheel down on this side of the row. The long extension is to throw the wheel out on solid ground. If this extension is only as long as the other axle extension the wheel would operate in a furrow. The thrust rod 27 is made in two sections to make it more flexible and thereby eliminate as far as possible vibrations and jolts that would break it if it were not somewhat flexible. This flexiblity is also increased by the ball and socket connection of the thrust rod 27 to member 19.

While I have illustrated a construction that I have found to be particularly effective, it will be obvious that many changes in the minor details of the construction and arrangement of parts may be made without departing from the spirit of the invention as defined in the appended claims.

We claim:—

1. A plow attachment for tractors including axle extensions having means for engagement with the front axle of a tractor, a bracket mounted on one of said extensions, a member extending upward from the last named extension, a thrust rod operatively engaging said member extending rearward therefrom and operatively engaged with the draw bar of the tractor, a plow beam pivotally mounted upon said bracket, and means detachably mounted upon the tractor whereby the plow beam may be raised or lowered.

2. A plow attachment for tractors including a plow beam, means for operatively supporting the plow beam upon the front axle of the tractor, means for raising or lowering the plow beam including a yoke mounted upon the plow beam, a bell crank lever pivotally and operatively mounted upon the front axle of the tractor, one arm of the bell crank lever having a roller disposed within said yoke and engaging the yoke and plow beam, a manually operable lever operatively connected to said bell crank lever whereby to shift the bell crank lever, means for holding the bell crank lever in a plurality of positions, and means permitting the plow beam to rise without affecting said lever.

3. A plow attachment for tractors including a plow beam, means for operatively supporting the plow beam upon the forward axle of the tractor and upon a transverse pivot, means for raising and lowering the plow beam including a yoke mounted thereon, a bell crank lever operatively supported upon the front axle of the tractor and including a rearwardly extending arm having a roller engaging between said yoke and the plow beam, an operating lever operatively supported upon the tractor and formed in two sections, said lever being operatively connected to said bell crank lever, means for holding the operating lever in any adjusted position, the two sections of the lever having such engagement with each other as will permit one of said sections to move with relation to the other section and without affecting the other section when the plow beam is lifted.

4. A plow attachment for tractors including axle extensions having means for engagement with the front axle of the tractor, one of said axle extensions having an upwardly projecting bracket, a forwardly and upwardly projecting bracket operatively engaged with said extension, a plow beam pivotally connected to the last named bracket and extending over said extension and then downward, a bell crank lever mounted upon the second named bracket and having a roller on one arm engaging beneath the lower edge of the plow beam, and manually operable means detachably mounted upon the tractor and engaging said bell crank lever whereby the bell crank lever may be shifted to raise or lower the plow beam.

5. A plow attachment for tractors including axle extensions having means for engagement with the front axle of the tractor, one of said axle extensions having an upwardly projecting bracket, a forwardly and upwardly projecting bracket operatively engaged with said extension, a plow beam pivotally connected to the last named bracket and extending over said extension and then downward, a bell crank lever mounted upon the second named bracket and having a roller on one arm engaging beneath the lower edge of the plow beam, manually operable means detachably mounted upon the tractor and engaging said bell crank lever whereby the bell crank lever may be shifted to raise or lower the plow beam, and a thrust rod operatively engaged with the second named bracket extending rearwardly therefrom and operatively engaged with the draw bar of the tractor.

6. A plow attachment for tractors including axle extensions having means for engagement with the front axle of the tractor, a forwardly and upwardly extending bracket attached to one of said axle extensions, a plow beam pivotally engaged with the bracket and extending over the extension, a second bracket forming part of said extension and projecting upward to one side of the plow beam, a bell crank lever mounted upon said last named bracket and having one of its arms provided with a roller engaging beneath the lower edge of the plow beam, a vertically disposed upright operatively supported upon the tractor and having a bell crank lever, a link connecting one arm of said last bell crank lever with an upwardly projecting arm on the second bell crank lever, a hand operated lever pivoted upon said upright and formed in two sections, a link connecting one of said sections to the second named bell crank lever, a rack over which said hand operated lever operates and whereby it may be held in any adjusted position, the two sections of the lever being engaged with each other for common upward movement when the hand operated lever is depressed but for independent movement when the plow beam is raised accidentally.

In testimony whereof we hereunto affix our signatures.

OSWALD BUESCHER.
RHYNE G. GOEBEL.